No. 773,989. PATENTED NOV. 1, 1904.
F. X. SAMMER.
MOWING AND HARVESTING MACHINE.
APPLICATION FILED JAN. 22, 1904.
NO MODEL. 2 SHEETS—SHEET 2.

WITNESSES:
Henry J. Suhrber.
J. Henry Gleeser.

INVENTOR
François Xavier Sammer
BY Foemer Niles
ATTORNEYS.

No. 773,989. Patented November 1, 1904.

UNITED STATES PATENT OFFICE.

FRANÇOIS XAVIER SAMMER, OF LE REPOSOIR, NEAR NYON, SWITZERLAND.

MOWING AND HARVESTING MACHINE.

SPECIFICATION forming part of Letters Patent No. 773,989, dated November 1, 1904.

Application filed January 22, 1904. Serial No. 190,204. (No model.)

*To all whom it may concern:*

Be it known that I, FRANÇOIS XAVIER SAMMER, a citizen of the Republic of Switzerland, residing in Le Reposoir, near Nyon, in the Republic of Switzerland, have invented certain new and useful Improvements in Mowing and Harvesting Machines, of which the following is a specification.

The invention relates to an improved harvesting-machine of that class having movable sliding cutters or mowing parts which are actuated independently of the movement of the machine over the ground by a motor device carried on the frame of the harvesting-machine, which movement may be accomplished in the usual manner by animal traction.

The invention consists in certain novel arrangements and constructions of parts, which will be hereinafter more fully described and finally pointed out in the claim.

Figure 1:
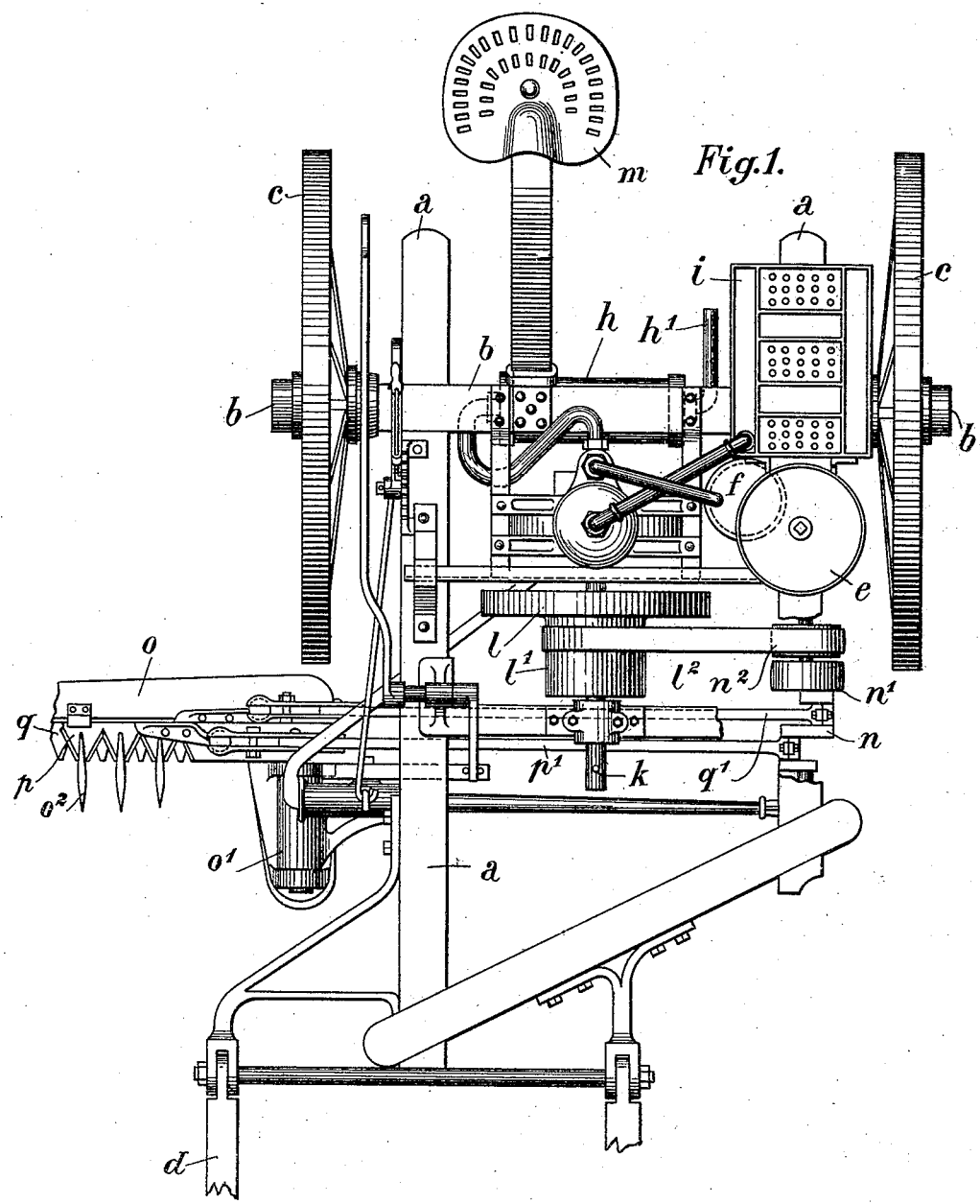
Figure 2:
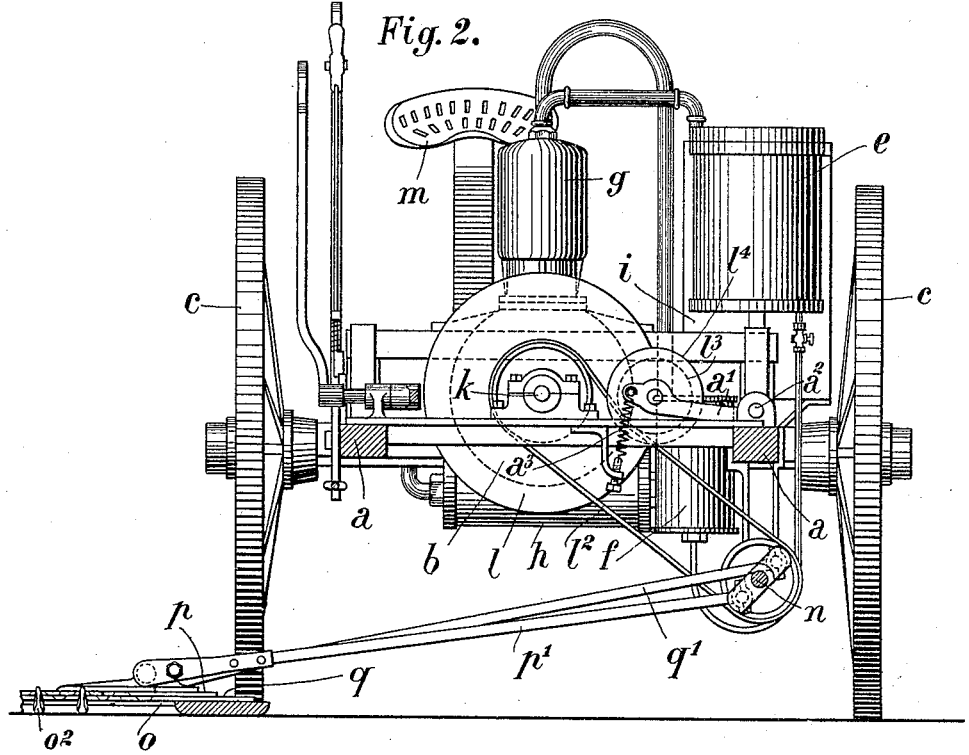
Figure 3:
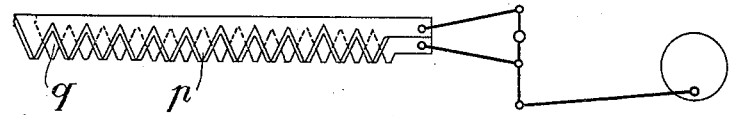
Figure 4:
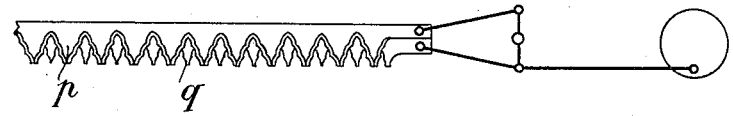
Figure 5:
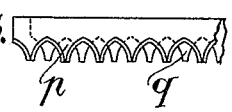

In the accompanying drawings, Figure 1 is a plan view of my improved mowing-machine, showing the coöperative relation of the parts thereof. Fig. 2 is a front elevation of the same, partly in cross-section and showing the relation of the cutters and motor device actuating the same. Figs. 3, 4, and 5 show modifications of the construction of the movable sliding cutter-knives.

Similar letters of reference indicate corresponding parts.

Referring to the drawings, a frame $a$, supported by an axle $b$ passing through the hubs of the wheels $c$, is provided with the usual seat for the driver or operator and a pair of shafts $d$, to which a draft-animal may be attached to move the machine over the ground. On the frame $a$ is arranged an explosion-motor comprising a tank $e$ for the storage of benzene or other desirable fuel, a carbureter $f$, a cylinder $g$, an exhaust-box $h$, a tank $i$ for the circulation of water, means for exploding the gases within the cylinder $g$, a piston arranged within the cylinder and actuated by the gases exploding in said cylinder, and motion-transmitting mechanism connecting with the outer end of said piston to impart a reciprocating motion to the sliding cutting parts of the machine.

The exhaust-box $h$ carries a pipe $h'$, extending parallel and close to the water-tank $i$ and provided with perforations in its side adjacent to said water-tank for the purpose of directing the exploded and cooled gases from the exhaust-box $h$ against the side of the water-tank $i$, so that the cooling action of these exhausted gases may prevent the water in the water-tank from becoming overheated. This usual construction of the device for cooling the cylinder by circulating water may be eliminated by causing the gases from the exhaust-box to be ejected directly against the outside of the cylinder $g$ for keeping the same cool, and thus removing the necessity of using the water-tank.

The means used for igniting the gases in the cylinder $g$ is not shown in Figs. 1 and 2, but may be any suitable sparking device such as is ordinarily used in explosion-motors.

The power and motion transmitting mechanism mounted on the frame $a$ and coöperating with the explosion-motor for actuating the sliding cutter-blades consists of a crank-shaft $k$, connected with and actuated by the piston-rod, a fly-wheel $l$, mounted on said shaft, and a pulley $l'$, connected to said fly-wheel and transmitting motion by a belt $l^2$ to a fixed pulley $n^2$ and a loose pulley $n'$, which are arranged on a shaft journaled in bearings underneath the frame $a$, said shaft being provided at one end with a double crank $n$, which is rotatably engaged by the upper ends of links $p'$ and $q'$, said links being attached at their lower ends to a cutting mechanism. This cutting mechanism consists of a longitudinally-slotted bar $o$, which is connected to the frame $a$ in the usual manner by a hinge $o'$, which carries the bar $o$, horizontally suspended from the frame $a$ in close proximity to the surface of the ground, the said bar being provided with forwardly-extending fingers $o^2$ on its front edge, which fingers are intended to divide the grass and guide it toward the movable cutting parts. These cutting parts are carried by the finger-bar and consist of two superposed knife-bars $p$ and $q$, slidably arranged in a slot or recess on the surface of said finger-bar, having teeth projecting or extending into slots of the fingers and given alternately longitudinally-reciprocating motion forwardly and backwardly in said slot and finger-bar by the links $p'$ and $q'$, respectively, to the lower ends of which they are connected. The cutters $p$ and $q$ are constructed with flat approximately triangularly shaped and forwardly-extending teeth or cutting-plates arranged on the front edge of the cutter-bar, the inclined sides or cutting edges of said cutting plates or teeth being either of straight or concavely-curved outline, they being preferably of the latter form and operated so as to have by their combined action a shearing cut on the grass in a manner similar to that of a scythe. The preferable form of cutters is curved, as shown in Figs. 4 and 5 of the drawings. This superposed arrangement and operation of two reciprocating cutter-bars having cutting edges of such curved form as shown has great efficiency and is capable of cutting more grass with the same power than the usual single cutter of the common type and shape.

The frame $a$ carries a rocking lever $a'$, pivoted at $a^2$ to the said frame and acted upon by a spring $a^3$. The said lever $a'$ carries a roller $l^3$, which rests against a belt $l^2$, connecting the pulleys $l'$ and $n^2$ and gives the belt the desired tension. The shaft of the roller $l^3$ carries a grinding-wheel $l^4$, which may be operated and used for grinding-cutters by taking motion from the belt $l^2$.

My improved mowing-machine with the explosion-motor has great advantages over the mowing-machines in general use, for by means of the motor the speed and action of the cutting-knives may be so controlled as to do a greater or lesser amount of work without affecting or increasing the amount of work necessary to be done or the power exerted by the traction force of the machine, which is entirely independent of the motor and in no way controls the operation of the movable cutting-knives on the finger-bar.

The machine is capable of being used as a movable or portable engine, for the belt $l^2$ may be removed from the pulley $n'$ and $n^2$ and connection may be made by belt with the pulley $l'$ on the motor-shaft $k$ for driving any other machine so connected. My improved mowing-machine thus fulfils all the requirements for an improved mowing-machine and a portable engine.

Having thus described my invention, I claim as new and desire to secure by Letters Patent—

In a mowing-machine, the combination, with the running-gear and a suitable frame carried thereby, of a finger-bar extending laterally from said frame, a motor mounted on said frame and having its shaft arranged longitudinally thereof, a second shaft mounted parallel to said first-named shaft and provided with crank portions, a suitable transmission between said first and last named shafts, connecting-rods attached to the crank portions of said last-named shaft, and oppositely-reciprocating cutter-bars attached to said connecting-rods and slidable on said finger-bar.

In testimony that I claim the foregoing as my invention I have signed my name in presence of two subscribing witnesses.

FRANÇOIS XAVIER SAMMER.

Witnesses:
L. H. MUNIER,
Y. IMER.